July 3, 1945.  I. J. SNADER ET AL  2,379,546
HYDRAULIC TRANSMISSION
Original Filed June 9, 1937   3 Sheets-Sheet 1
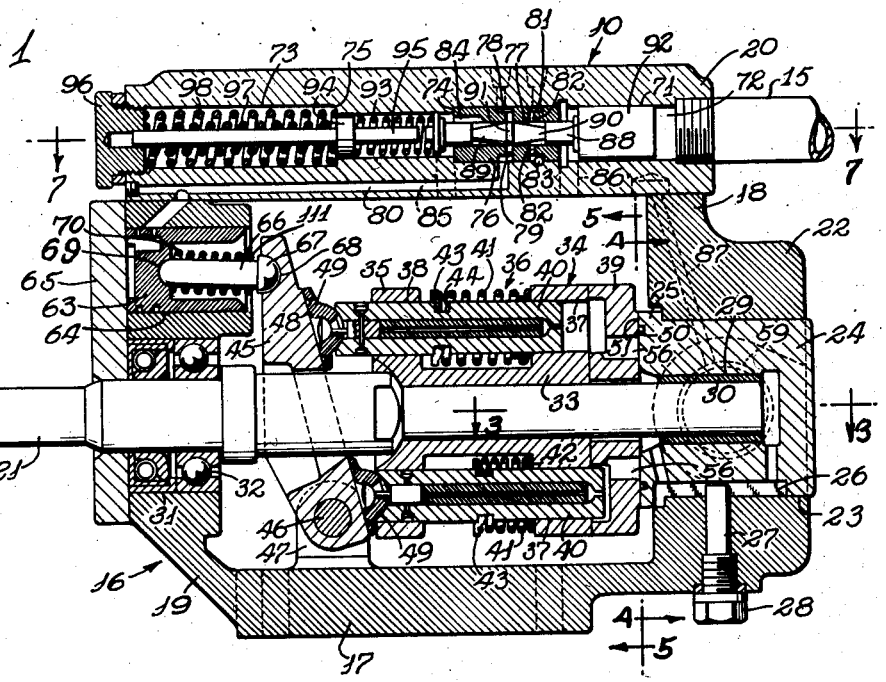
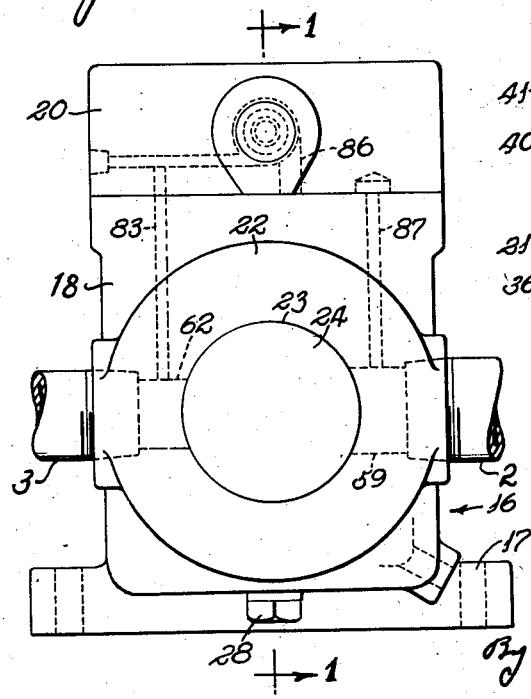
INVENTORS
Ira J. Snader
Max A. Mathys
By Parker, Carlson, Pitney & Hubbard
ATTORNEYS

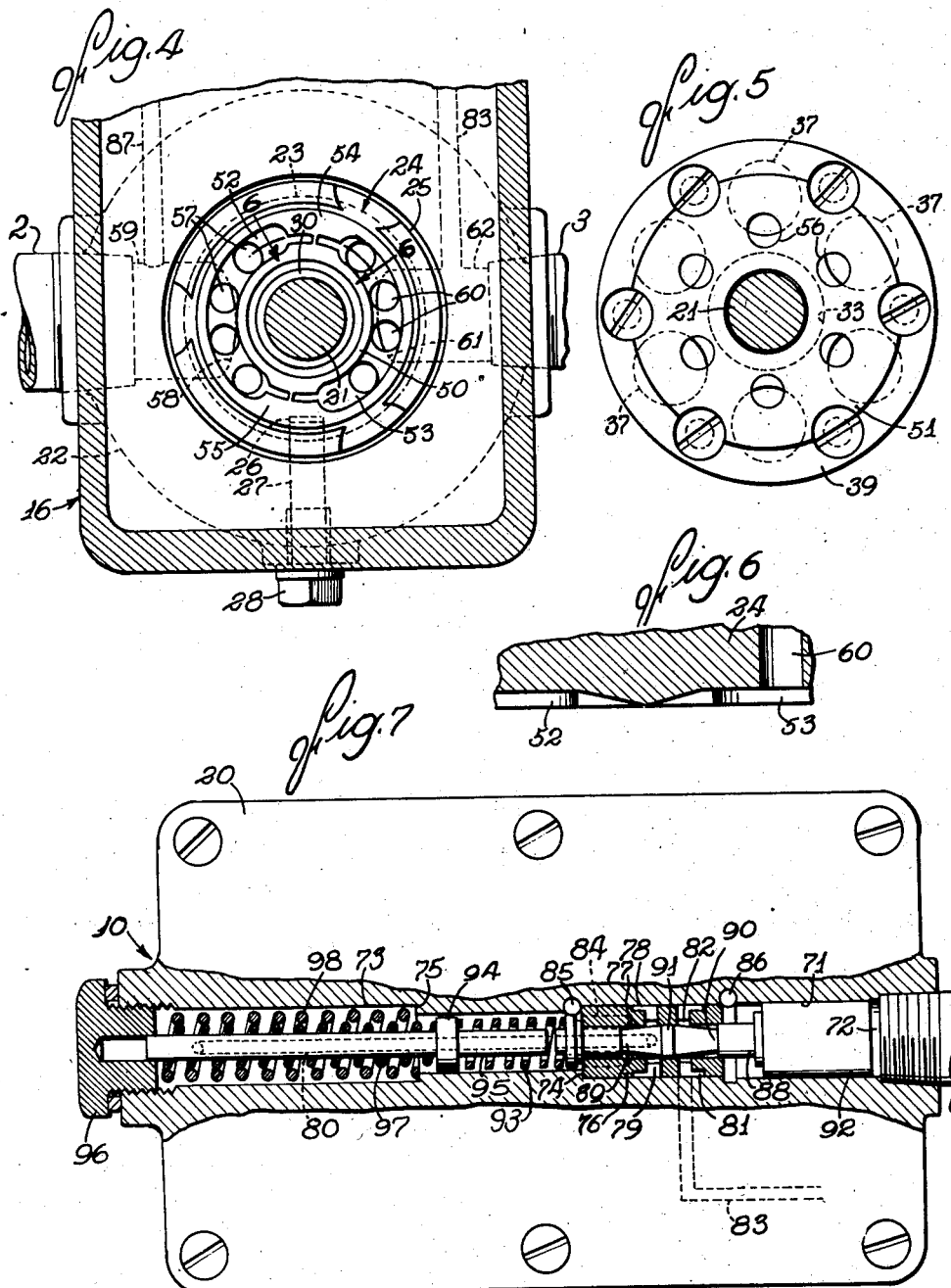

July 3, 1945.  I. J. SNADER ET AL  2,379,546
HYDRAULIC TRANSMISSION
Original Filed June 9, 1937  3 Sheets-Sheet 3
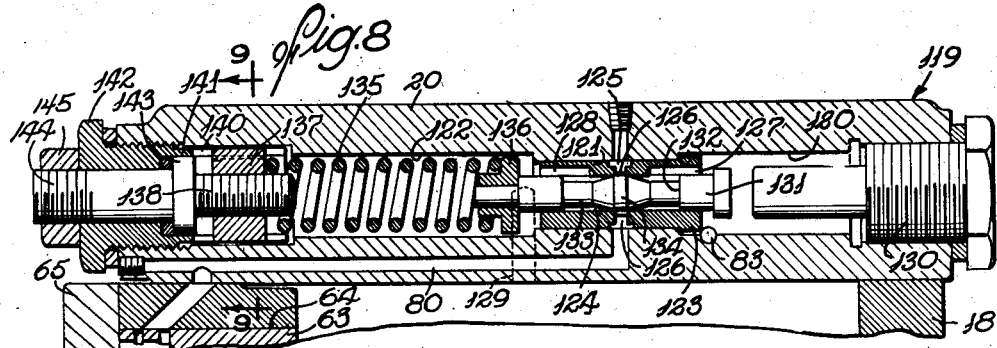
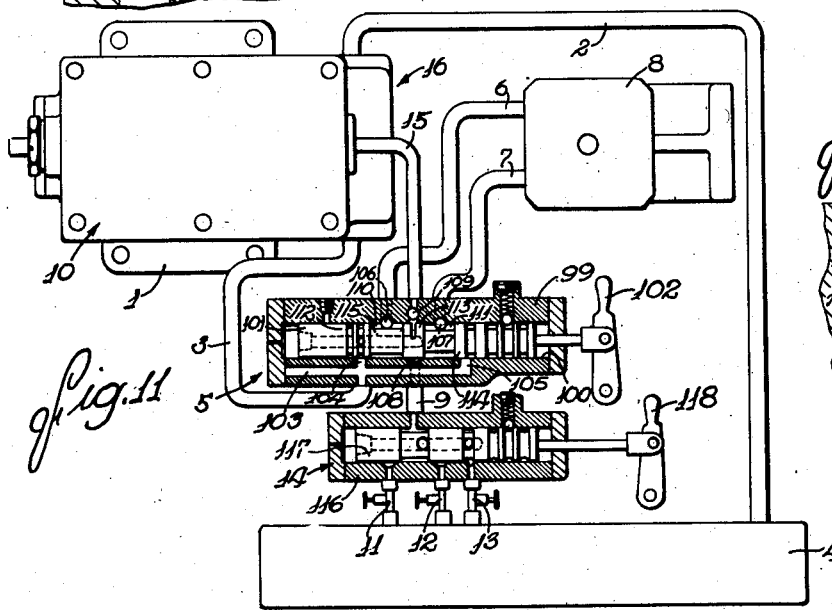
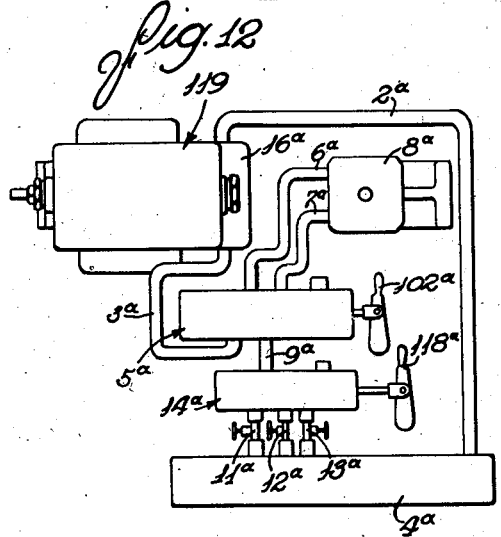
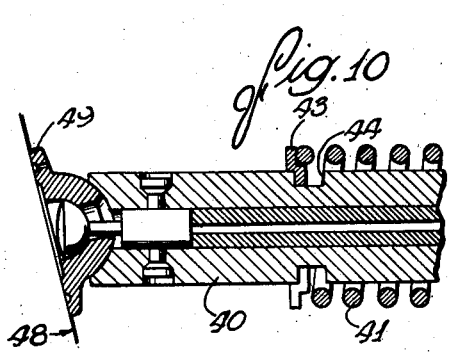
INVENTORS
Ira J. Snader
Max A. Mathys
By Parker, Carlson, Pitner & Hubbard
ATTORNEYS Patented July 3, 1945

2,379,546

UNITED STATES PATENT OFFICE 2,379,546

HYDRAULIC TRANSMISSION

Ira J. Snader and Max A. Mathys, Detroit, Mich., assignors to Ex-Cell-O Corporation, Detroit, Mich., a corporation of Michigan Original application June 9, 1937, Serial No. 147,178, now Patent No. 2,299,234, dated October 20, 1942. Divided and this application July 31, 1940, Serial No. 348,905

8 Claims. (Cl. 60—53)

The present invention relates generally to improvements in hydraulic transmissions and has particular reference to a new and improved transmision adapted especially for machine tools.

One of the objects of the invention is to provide a novel hydraulic transmission including a motor and a pump for supplying fluid under pressure to the motor in which the delivery of the pump is fully utilized at all times in doing useful work, and is varied as required without the use of relief valves or other accessories commonly employed for by-passing excess fluid.

Another object is to provide a new and improved hydraulic transmission of the foregoing character in which the speed of the motor, although selectively adjustable, will be substantially constant regardless of varying load conditions and resulting variations in leakage in the pressure side of the system.

A more specific object is to provide a novel hydraulic transmission of the foregoing character in which the delivery of the pump is automatically adjustable in response to a control pressure built up in the exhaust line of the motor by an interposed flow restriction.

Further objects and advantages will become apparent as the description proceeds.

In the accompanying drawings,

Figure 1 is an axial sectional view, taken along line 1—1 of Figure 2, of a pump forming part of a hydraulic transmission embodying the features of our invention.

Fig. 2 is an end elevational view of the pump.

Fig. 3 is a fragmentary sectional view of the pump valve taken along line 3—3 of Fig. 1.

Fig. 4 is a fragmentary transverse sectional view taken substantially along line 4—4 of Fig. 1, and showing the face of the stationary valve member.

Fig. 5 is a fragmentary transverse sectional view taken substantially along line 5—5 of Fig. 1, and showing the face of the movable valve member.

Fig. 6 is a sectional detail view taken along line 6—6 of Fig. 4.

Fig. 7 is a horizontal sectional view taken substantially along line 7—7 of Fig. 1, but with the volume control valve in a different position of adjustment.

Fig. 8 is a longitudinal sectional view of a modified form of volume control valve.

Fig. 9 is a transverse sectional view taken along the line 9—9 of Fig. 8.

Fig. 10 is an enlarged fragmentary sectional view of one of the pump pistons.

Fig. 11 is a diagrammatic view of one form of hydraulic transmission embodying the features of our invention.

Fig. 12 is a diagrammatic view of a modified form of the hydraulic transmission including the pump with the volume control valve of Fig. 8.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

The present application is a division of our copending application No. 147,178, filed June 9, 1937 (Patent No. 2,299,234, issued October 20, 1942).

*Brief general résumé of invention*

The hydraulic transmission (see Fig. 11) constituting the exemplary embodiment of the invention comprises a variable delivery pump 1 having an intake line 2 and a pressure delivery line 3. The intake line 2 connects with a suitable source of fluid supply, such, for example, as a sump or reservoir 4. The delivery line 3 is adapted to be connected by a direction valve 5 selectively to one or the other of two lines 6 and 7 leading respectively to opposite sides of a hydraulic motor 8. This motor may be of the reversible rotary type. Upon connecting the pump delivery line 3 to one of the motor lines 6 and 7, the direction valve 5 serves to connect the other motor line to an exhaust line 9 discharging to the sump 4.

Adjustment of the pump delivery is under the control of an automatic valve 10 responsive to a pressure in the hydraulic circuit reflecting the load conditions of the motor 8. More particularly, the control valve 10 cooperates with adjustable flow restriction means interposed in the exhaust line 9 to vary the pump delivery in accordance with the motor requirements so that the motor may be operated at different predetermined substantially constant speeds. In the present embodiments, the flow restriction means consists of three parallel adjustable orifices 11, 12 and 13 selectively available under the control of a valve 14. The orifices may be adjusted to different sizes and serve to build up a low back pressure controlling the speed of the motor 8. Assuming the motor to be connected to drive a reciprocatory machine tool carriage (not shown), the largest orifice 11 when connected is adapted to effect rapid traverse, the smallest orifice 12 when connected is adapted to effect a slow feed, and the intermediate orifice 13 when connected is adapted to effect a relatively fast feed. In Fig. 11, the control valve 10 is responsive to the pressure in the line 9 at the upstream side of the orifices 11, 12 and 13, and to this end, is adapted to be connected through a control line 15 by the direction valve 5 when in operative position to the line 9. For any selective orifice restriction, tending pressure variations in the line 9 will effect compensatory adjustments in the pump delivery so that the pressure drop across the restriction 11, 12 or 13 will remain practically uniform regardless of the motor torque. Consequently, the speed of the motor 8 for any given restriction will remain substantially constant.

*The hydraulic pump*

The particular hydraulic pump 1 utilized in the transmission comprises a closed housing 16 preferably generally rectangular in shape, and having a bottom wall 17 adapted to be secured to a suitable support (not shown). The housing 16 also has opposite end walls 18 and 19, and is closed at the top by a removable cover plate 20.

A suitable drive shaft 21 extends longitudinally through the housing 16, and is journaled at opposite ends in the walls 18 and 19. Integral with the wall 18 is a large external circular boss 22 having an axial bore 23 counterbored at the inner end. A stationary valve plug 24, in the form of a single cylindrical block, is tightly pressed into the bore 23, and is located axially by a peripheral end flange 25 seated in the counterbore. To locate the plug 24 angularly, it is formed with a longitudinal groove 26 engaging a pin 27 on the inner end of a screw 28 threaded radially into the boss 22. Formed in the plug 24 is an axial bore 29 which is closed at the outer end, and which is open and flared at the inner end. A bushing 30 is fitted in the bore 29, and supports one end of the shaft 21. The opposite end wall 19 is formed with a bore 31 in axial alignment with the bushing 30. Preferably, an antifriction bearing 32 is mounted in the bore 31 to support the shaft 21 which extends therefrom externally of the housing 16 for connection to a suitable source of power (not shown).

Secured to the shaft 21 for rotation therewith is a cylinder block or body 33 which is in the form of a spool having a peripheral cylinder flange 34 and an axially spaced guide flange 35, and defining an intermediate spring space 36. A plurality of parallel bores 37, six in the present instance, open through the flange 34, and constitute pump cylinders annularly arranged in uniformly spaced relation about the shaft 21. Similarly, the flange 35 is formed with guide bores 38 in axial alignment with the bores or cylinders 37. Rigidly secured to the outer end face of the flange 34 is a circular valve plate 39 which closes the pressure ends of the cylinders 37, and which preferably is formed with circular recesses defining slightly enlarged closed end extensions of the cylinders.

A plurality of pump plungers or pistons 40 are reciprocably disposed respectively in the open ends of the cylinders 37 and are slidably guided at their outer ends in the bores 38. The pistons 40 are urged outwardly on their suction or intake strokes by individual compression springs 41 located within the annular space 36. Each of the springs 41 seats at one end against a ring retainer 42 positioned against the flange 35, and at the other end against a key retainer 43 engaging a peripheral groove 44 in the associated piston 40.

The pistons 40 are operable in uniformly timed sequence, with a variable stroke as hereinafter described, by a swash or cam plate 45 which is journaled on a pin 46 for angular or rocking adjustment into different inclined positions. The pin 46 is pressed in spaced lugs 47 in the housing 16 and is perpendicular to the axis of the shaft 21. The plate 45 has a flat annular cam face 48 which freely encircles the shaft and which is engaged by floating shoes 49 operatively connected to the outer ends of the pistons 40.

The valve plug or stator 24 and the plate 39 have annular end faces 50 and 51 in bearing engagement, and constitute a rotary end face valve for controlling the admission and discharge of fluid respectively to and from the pump units. Formed in the stator 24 are two arcuate suction and delivery ports 52 and 53 separated by diametrically spaced land areas 54 and 55 and arranged in concentric relation to the shaft 21. These ports are located at opposite sides of an axial plane intersecting the land areas and perpendicular to the pivotal axis of the swash plate 45. Formed in the valve face 51 of the plate 39 are a plurality of ports 56 which open respectively to the closed ends of the pump cylinders 37, and which are annularly arranged in a circle of the same curvature as the ports 52 and 53 for movement successively across the latter upon rotation of the cylinder body 33.

It will be evident that when the swash plate 45 is angularly disposed, rotation of the cylinder body 33 will cause the pistons 40 to be reciprocated in timed sequence and with a simple harmonic motion, and that each piston will be moving through its suction and pressure strokes while the associated cylinder 37 is in communication respectively with the inlet and delivery ports 52 and 53. As the pistons 40 of each set of diametrically opposed pistons reach top and bottom dead centers respectively, the associated cylinders 37 will be closed by the land areas 54 and 55, and at these times only two cylinders will be open to each of the valve ports 52 and 53. At all other times, three cylinders 37 will be open to each of the valve ports 52 and 53. Consequently, the pump will discharge continuously, and the rate of discharge will be substantially constant for any given setting of the swash plate 45. If the angular position of the swash plate 45 is changed, the length of the piston strike will be adjusted to adjust the rate and volume of pump delivery. When the plate 45 is adjusted into a plane perpendicular to the shaft 21, no reciprocation will be imparted to the pistons 40.

As an important factor in avoiding noise, the volume of pressure liquid in the closed ends of the cylinders 37 at the end of the pressure stroke is held to a minimum. To this end, the piston clearance in the valve plate 39 is made as small as is practically convenient. Also, the pivot pin 46 is located at a point adjacent the axis of each piston 40 as the latter moves into dead center position at the end of the pressure stroke. As a result the inward limit of movement of the pistons 40 is substantially constant and close to the inner ends of the cylinders 37 while the outward limit of movement is variable in accordance with changes in the angular position of the swash plate 45.

The inlet port 57 may be connected in any suitable manner to the source of liquid supply, and in the present instance is in communication at the bottom or foot with a plurality of longitudinal bores 57 in the valve plug 24. The outer ends of the bores 57 are intersected by a recess 58 formed in the periphery of the plug, and registering with a passage 59 opening through the peripheral wall of the boss 22. The line 2 is connected to the passage 59. The delivery port 53 is in communication at the bottom or root with a plurality of longitudinal bores 60 formed in the plug 24. A recess 61 in the periphery of the plug 24 intersects the bores 60, and is in registration with an outlet passage 62 opening through the boss 22 and connected to the delivery or pressure line 3.

*Pump adjusting means*

In its preferred form, the pump adjusting means comprises a control piston 63 acting on the free end of the swash plate 45 in a direction to level off the latter against the hydraulic reaction in the cylinders 37 and the action of the piston return springs 41. The control piston 63 is reciprocable in a cylinder 64 opening through the wall 19, and closed at the outer end by a cover or stop plate 65. The cylinder 64 extends parallel to the shaft 21, and preferably is located diametrically opposite the pin 46 and outside the circle of revolution of the cylinders 37 so that the thrust of the piston 63 against the plate 45 will have a moment arm considerably longer than that of the aggregate opposing forces resulting from the hydraulic reaction through the pistons 40. The diameter of the piston 63 and the moment arm of the force exerted thereby determine the pressure required in the cylinder 64 in relation to the pump delivery pressure to balance the cam or swash plate 45. By providing a comparatively large diameter and a relatively long moment arm as shown, the balancing pressure required in the cylinder 64 will be much lower than the corresponding pump delivery pressure.

The control piston 63 is operatively connected to the swash plate 45 by a pin 66. One end of the pin 66 is formed with a spherical head 67 seated for universal pivotal movement in a complemental socket 68 in the free end of the plate 45, and the other end is rounded and seated in a complemental socket 69 in the end wall of the piston 63. A coiled compression spring 70 acts to maintain the head 67 within the socket 68.

The piston 63 is controlled by the metering valve 10 which is operable to admit fluid under pressure to the closed end of the cylinder 64 or to exhaust fluid therefrom respectively upon an increase or decrease in the pressure in the line 15, whereby the speed of the hydraulic motor 8 is maintained constant regardless of varying load conditions. For example, if the load is increased, which results in increased leakage, the motor 8 will tend to slow down and hence exhaust less fluid, but the resulting drop in the pressure built up by the orifice restriction will immediately effect a compensatory increase in the pump delivery.

Preferably, the valve 10 is built into the cover 20, and comprises a bore 71 opening therethrough and enlarged at opposite ends to define a pressure chamber 72, a spring chamber 73 and oppositely facing shoulders 74 and 75. A valve sleeve 76 is fixed in the bore 71 against the shoulder 74, and is formed with an axial valve passage 77. A peripheral groove 78 opens through radial ports 79 to the passage 77, and is in registration with a passage 80 connecting with the closed end of the cylinder 64. The sleeve 76 is also formed at one side of the groove 78 with a second peripheral groove 81 opening through a plurality of radial inlet ports 82 to the valve passage 77, and registering with a pressure supply passage 83 in the cover 20 and wall 18 connecting with the pump outlet passage 62. Formed in the end of the sleeve 76 at the opposite side of the groove 78 and longitudinally intersecting the valve passage 77 to define exhaust ports are a plurality of bores 84 opening to the reduced intermediate section of the bore 71. Two relief passages 85 and 86 open from the bore 71 at opposite ends of the sleeve 76 through the cover 20 to the interior of the pump housing 16 from where spent fluid may be discharged through a passage 87 to the pump inlet passage 59.

Reciprocally disposed in the sleeve 76 is a valve member 88 of the spool type having two spaced peripheral grooves 89 and 90 opening respectively to the inlet and exhaust ports 82 and 84, and separated by a collar 91 adapted in intermediate position to block the control ports 79. To obtain accurate metering, the roots of the grooves 89 and 90 are tapered conically in opposite directions to restrict gradually the flow connection with the ports 79 as the valve member 88 is moved toward neutral position.

The valve member 88 is operable by a pressure responsive element 92 and resilient pressure means 93 acting in opposition. In the present instance, the element 92 consists of a piston in abutment with one end of the valve member 88, and reciprocable in the pressure chamber 72. The control line 15 opens from the outer end of the chamber 72 to the direction valve 5 for connection with the exhaust line 9 when the motor 8 is in operation, and with the pump discharge line 3 when the valve 5 is in stop position.

The resilient pressure means 93 consists of a square wire coil compression spring engaging the other end of the valve member 88 and seating against a collar 94 slidably guided in the intermediate section of the bore 71. The collar 94 is integral with a pin 95, one end of which extends through the spring 93 into closely spaced relation to the valve member 88, and the other end of which is guided in a screw plug 96 closing the outer end of the spring chamber 73. The spring 93 is maintained under normal compression by a second spring 97 encircling the pin 95 and seating under compression at opposite ends against the collar 94 and the plug 96. The two springs 93 and 97 have different natural periods of frequency, so that any vibrations tending to result therein from pump pulsations are out of synchronism and neutralize or offset each other. Hence, the valve member 88 is maintained in sensitive balance without fluttering. A heavy coil compression shock spring 98 encircles the spring 97 and normally abuts at opposite ends against the shoulder 75 and the plug 96. The inner end convolution of the spring 98 projects inwardly for engagement by the collar 94 in the event of sudden and extended movement of the valve member 88 by the piston 92.

The valve 10 is of the graduated metering type, and when in control is normally either closed or slightly open to permit only a restricted flow. The flow restriction in the valve 10 results in a large pressure drop in the passage 80 when connected to the passage 83 so that the control pressure on the piston 63 is reduced and always less than the pump delivery pressure. Only small valve movements are required and only small pressure changes are necessary to move the valve member 88. The control is sensitive and does not reflect or develop pulsations at critical motor speeds.

Circuit valves

The direction valve 5 may be of any suitable character and for purposes of illustration is herein disclosed as comprising an outer casing 99 having an axial bore 100, and a reciprocatory valve member 101 of the spool type in the bore. Although the direction valve 5 may be controlled either automatically or manually, the valve member 101 is shown connected to a hand lever 102. The delivery line 3 of the pump 1 is connected to a passage 103 opening through ports 104 and 105 at spaced points to the bore 100. Intermediate these ports are two ports 106 and 107 opening respectively to the motor lines 6 and 7. Intermediate these ports are two ports 108 and 109 opening respectively to the exhaust line 9 and the control line 15. The valve member 101 has two peripheral grooves 110 and 111 defining spaced heads 112 and 113 and 114. In one end position of the valve member 101 the groove 110 will connect the delivery line 3 to the motor line 6, and will connect the motor line 7 to the exhaust line 9. In the other end position these connections will be reversed. In either end position, the valve member 101 will connect the control line 15 to the exhaust line 9. In the neutral or stop position, the heads 112, 113 and 114 serve to block the motor lines 6 and 7 from both the delivery line 3 and the exhaust line 9, and interrupt communication between the control line 15 and the exhaust line 9. Formed in the valve member 101 is a passage 115, the opposite ends of which are movable respectively into communication with the inlet port 104 and the control port 109 upon movement of the direction valve 5 into intermediate stop position, thereby connecting the delivery side of the pump 1 directly to the control line 15.

The selection valve 14 also may be of any suitable character and is herein shown as comprising a casing 116 and a valve member 117 adjustable by hand actuator 118 to connect the exhaust line 9 to the sump 4 through any one of the three adjustable restricted orifices 11, 12 and 13.

Operation

In operation, when the orifice restriction in the line 9 is set for maximum opening, as by connecting the orifice 11, a relatively low pressure drop is maintained, and hence the liquid or oil exhausting from the motor 8 is practically free to return without restriction to the sump 4. Since no effective pressure will prevail in the line 15, the valve member 88 will be adjusted by the springs 93 and 97 into its extreme right hand position as shown in Fig. 7, forcing the piston 92 to the right, thereby fully exhausting the control cylinder 64 and causing the pump to deliver at maximum capacity.

If the orifice restriction is now gradually increased, as by connecting the orifice 13 for fast feed, a pressure will build up in the control line 15, and act through the piston 92 to force the valve member 88 and pin 95 to the left until the collar 94 engages the shock spring 98 as shown in Fig. 1. The valve member 88 will continue movement against the action of the spring 93 to connect the passages 80 and 83, whereupon the swash plate 45 will be adjusted to reduce the delivery of the pump to a point where the resultant pressure in the line 15 will maintain the valve 10 in closed position.

After the piston 63 is away from the stop plate 65, the pressure in the line 15 will be maintained substantially constant regardless of gradual changes in the size of the orifice restriction. For example, if the orifice restriction is still further increased, as by connecting the smallest orifice 12, the same pressure in the line 15 will be maintained by a corresponding reduction in the volume of pump delivery to obtain a slow feed. In general, the pressure drop across the orifice restriction will be constant for all sizes of orifices, and the volume of liquid flow therethrough will be constant for any one size but will vary with different sizes. Hence, the speed of the motor 8 for any given orifice setting will be constant regardless of varying load conditions and resulting variations in leakage in the pressure side of the system, and will be determined entirely by the size of orifice employed. The delivery of the pump is fully utilized at all times in doing useful work, and is varied as required without the use of relief valves and other accessories commonly employed for by-passing excess fluid.

The leveling adjusting of the swash plate 45 is gradual by reason of the metering characteristics of the valve 10. However, if the orifice restriction should be changed or closed suddenly, a pressure impulse would be transmitted through the line 15 and cause the valve member 88 acting through the pin 95 to compress the shock spring 98, thereby permitting the pressure fluid to level off the plate 45 immediately. Conversely, if there should be a sudden pressure drop in the line 15, the spring 97 would urge the valve member 88 far to the right to effect an immediate and substantial increase in pump delivery. Upon movement of the reversing valve 5 into neutral position, the motor lines 6 and 7 will be blocked, and the control line 15 will be disconnected from the exhaust line 9 and connected to the pump discharge line 3. Since the line 3 is also otherwise blocked, the delivery pressure of the pump will rise and effect movement of the swash plate 45 into level position to stop delivery.

Modified pump control valve

A modified form of metering valve 119 for controlling the volume of pump delivery in response to the pump delivery pressure is illustrated in Fig. 8. The valve 119 is built into the pump cover 20, and comprises a bore opening longitudinally therethrough and consisting of three sections 120, 121, and 122. A valve sleeve 123 is fixed in the intermediate bore section 121, and is formed with an axial passage 124, an external peripheral groove 125 opening through radial ports 126 to the passage and communicating with the passage 80 leading to the control cylinder 64, and a plurality of longitudinal bores 127 and 128 in opposite ends longitudinally intersecting the valve passage 124 to define inlet and outlet ports opening respectively to the bore sections 120 and 122. A passage 129 connects the bore section 122 to the interior of the casing 16. The bore section 120 is closed by a plug 130, and is connected to the pressure passage 83 leading from the pump outlet passage 62.

A valve member 131 is reciprocable in the passage 124, and is formed with spaced external peripheral grooves 132 and 133 defining an intermediate land 134 adapted in neutral position to close the ports 126. The roots of the grooves 132 and 133 are conically tapered to effect gradual valve restriction as the valve member 131 is moved toward closed position.

Fluid pressure in the bore section 120 tends to move the valve member 131 in a direction to connect the ports 126 and 127 to effect a decrease in the pump delivery. A coiled compression spring 135 opposes the pump delivery pressure, and tends to move the valve member 131 in a direction to connect the ports 126 and 128 to effect an increase in the pump delivery. The spring 135 is disposed in the bore section 122 and bears at one end against a shoe or retainer 136 fixed on the valve member 131, and at the other end against an adjustable stop 137. Preferably, the stop 137 consists of a nonrotatable nut threaded on an adjusting screw 138 and having longitudinal keys 139 slidable in slots 140 in a guide sleeve 141. The sleeve 141 is integral with a plug 142 threaded into and closing the outer end of the bore section 122. The screw 138 has a shoulder 143 disposed rotatably against the inner face of the plug 142, and has a shaft 144 extending axially through the latter for external adjustment. A lock nut 145 on the shaft 144 is available to clamp the screw 138 in adjusted position.

The pump with the modified valve 119 is included as the source of pressure fluid in the hydraulic machine tool circuit shown in Fig. 12. Since the pump is controlled directly from the delivery presure, this circuit does not include a control line, such as the line 15, to the exhaust side of the system, but in all other respects it is like the circuit in Fig. 11, and hence like parts are identified by the same reference numerals plus the subscript $a$.

In operation, when the motor torque is low and the largest orifice $11^a$ is connected, the spring 135 will hold the valve member 131 to the right against the stop 130, so that the pump will deliver at maximum capacity. Upon an increase in pressure due to a load increase or a greater orifice restriction, as by connecting the orifice $12^a$ or orifice $13^a$, the valve member 131 will be forced to the left against the action of the spring 135 to supply fluid under pressure to the control cylinder 64. Thereafter, the valve 119 will maintain a constant maximum pressure, subject to adjustment by varying the initial tension of the spring 135, and will cause the pump to supply whatever fluid the system is able to take at this pressure.

We claim as our invention:

1. A hydraulic operating circuit comprising, in combination, a pressure supply line, a sump, an exhaust line discharging to said sump, a hydraulic motor adapted to receive fluid from said supply line and to discharge spent fluid to said exhaust line, adjustable flow restriction means of predetermined area in said exhaust line for building up a back pressure therein, and a variable delivery pump having an inlet line from said sump and discharging to said pressure supply line, said pump including means for automatically controlling the pump delivery to said supply line in response to a predetermined pressure in said circuit influenced by said delivery.

2. A hydraulic operating circuit comprising, in combination a pressure supply line, an exhaust line, a hydraulic motor adapted to receive fluid from said supply line and to discharge spent fluid to said exhaust line, adjustable flow restriction means of predetermined fixed area in said exhaust line for building up a back pressure therein, and a variable delivery pump discharging to said pressure supply line, said pump including means for automatically controlling the volume of pump delivery to said supply line in response to a predetermined pressure in said circuit influenced by said delivery, whereby to maintain said predetermined pressure constant.

3. A hydraulic operating circuit comprising, in combination, a pressure supply line, an exhaust line, a hydraulic motor adapted to receive fluid from said supply line and to discharge spent fluid to said exhaust line, adjustable flow restriction orifice means in said exhaust line for building up a back pressure therein, and a variable delivery pump discharging to said pressure supply line, said pump including means for automatically controlling the volume of pump delivery to maintain a constant pressure in said supply line regardless of adjustment of said restriction means.

4. A hydraulic operating circuit comprising, in combination, a pressure supply line, an exhaust line, a hydraulic motor adapted to receive fluid from said supply line and to discharge spent fluid to said exhaust line, adjustable flow restriction means in said exhaust line for building up a back pressure therein, and a variable delivery pump discharging to said pressure supply line, said pump including means for automatically controlling said pump delivery in response to said back pressure to maintain said pressure constant under all load conditions and for all adjustments of said restriction means.

5. A hydraulic operating circuit comprising, in combination, a pressure supply line, an exhaust line, a reversible hydraulic motor having inlet and outlet lines, a direction valve for connecting said motor lines reversibly and respectively to said supply and exhaust lines and interrupting said connections in neutral position, a plurality of parallel restricted flow orifices, selector valve means for connecting any one of said orifices in said exhaust line to build up a back pressure therein, a variable delivery pump for delivering fluid under pressure to said supply line, and control means for automatically adjusting said pump to vary the volume of delivery as required to maintain said back pressure constant during motor operation regardless of which orifice is connected in said exhaust line and to stop the delivery of said pump upon movement of said valve into neutral position.

6. A hydraulic operating circuit comprising, in combination, a pressure supply line, an exhaust line, a hydraulic motor adapted to receive fluid from said supply line and to discharge spent fluid to said exhaust line, a plurality of flow restriction orifices, a valve for connecting said orifices selectively in said exhaust line for building up a back pressure therein, and a variable delivery pump discharging to said pressure supply line, said pump including means for automatically controlling said pump delivery in response to said back pressure to maintain said pressure constant under all load conditions and for all adjustments of said restriction means.

7. A hydraulic operating circuit comprising, in combination, a pressure supply line, an exhaust line, a hydraulic motor adapted to receive fluid from said supply line and to discharge spent fluid to said exhaust line, flow restriction means in said exhaust line for building up a back pressure therein, a variable delivery pump discharging to said pressure supply line, means for automatically adjusting said pump to control the pump delivery and including a control line, and a valve movable into one position to disconnect said supply line from said motor and to connect said control line to said supply line whereupon said means will stop pump delivery, and movable into another position to connect said supply line to said motor and said control line to said exhaust line whereupon said means will maintain said back pressure constant.

8. A hydraulic operating circuit comprising, in combination, a pressure supply line, an exhaust line, a hydraulic motor adapted to receive fluid from said supply line and to discharge spent fluid to said exhaust line, speed control flow restriction means in said exhaust line for building up a back pressure therein, a variable delivery pump discharging to said pressure supply line and including means for automatically controlling the pump delivery to maintain a constant maximum delivery pressure, and a start and stop valve in said supply line.

IRA J. SNADER.
MAX A. MATHYS.